United States Patent Office 2,751,114
Patented June 19, 1956

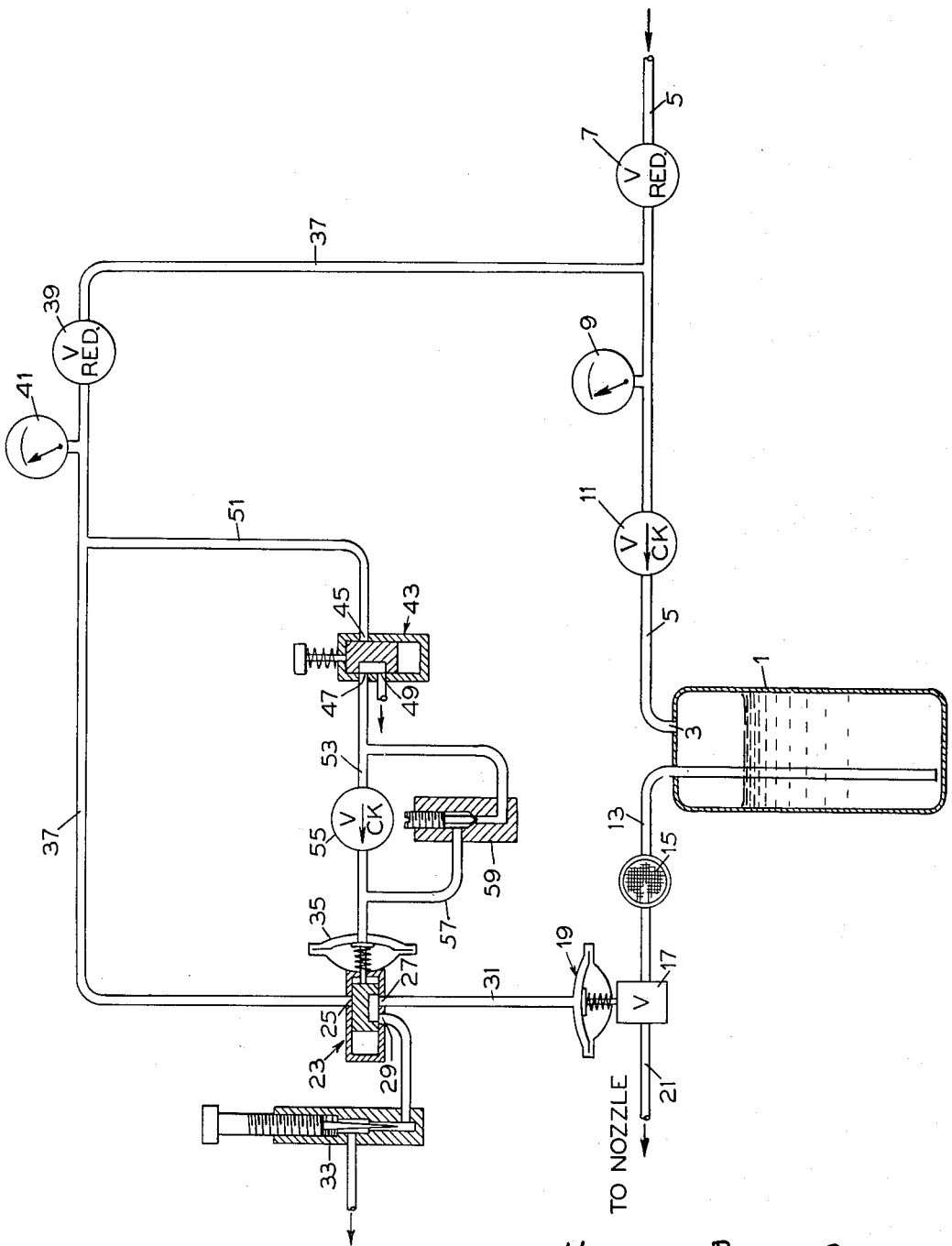

2,751,114

LIQUID DISPENSING APPARATUS

Herman Bruce Greaves, Lemay, Mo.

Application October 23, 1953, Serial No. 388,018

3 Claims. (Cl. 222—70)

This invention relates to liquid dispensing apparatus, and more particularly to apparatus for dispensing measured dosages of a liquid fumigant or the like.

Among the several objects of the invention may be noted the provision of an apparatus for effectively dispensing small measured dosages of a liquid fumigant or the like, and more particularly a fumigant such as is disclosed in U. S. Patent 2,606,857, for spot fumigation in cereal mills or the like; the provision of apparatus of this class wherein the dosage may be readily varied at will; the provision of apparatus of the class described which is adapted to be powered by air pressure such as is usually available in cereal mills; and the provision of apparatus of the class described which is economical to manufacture and reliable in operation. Other objects and features will be in part pointed out hereinafter.

The invention accordingly comprises the constructions hereinafter described, the scope of the invention being indicated in the following claims.

In the accompanying drawing, in which one of various possible embodiments of the invention is illustrated, the single figure is a semidiagrammatic view with certain parts shown in section.

Referring to the drawing, there is shown at 1 a pressure vessel for containing a supply of liquid fumigant or the like. The vessel has an inlet at 3 to which is connected a line 5 for supplying the vessel with air under pressure from a suitable source of compressed air (not shown). Line 5 includes, in succession, a reducing valve 7, a pressure gauge 9 and a check valve 11. Reducing valve 7 is adjustable for obtaining various air pressures in the vessel 1. Check valve 11 opens for flow of air to the vessel 1, and prevents fumigant from being forced back in line 5.

At 13 is shown an outlet line leading from the vessel. This line includes a strainer 15 and an outlet valve 17. Valve 17 has a control 19 operable by air under pressure for opening the valve and adapted upon being vented to close the valve. As shown, this control 19 may be of the diaphragm type, having a return spring for returning the valve to closed position upon venting of the control. Valve 17 is normally held in closed position by the spring of the control 19 to hold fumigant in the vessel 1 against pressure in the vessel. By opening the valve 17 for a predetermined length of time, a measured dose of fumigant may be dispensed from the vessel to a line 21 leading to a nozzle (not shown) for directing a dose of fumigant where desired. Line 21 will usually consist of a length of hose and may include a spring-loaded check valve to prevent leakage and dribbling of fumigant.

At 23 is shown a relay valve having an inlet 25 for air under pressure, an outlet 27, and a vent port 29. The outlet 27 of the relay valve is connected to the control 19 of the outlet valve by a line 31. An adjustable bleeder 33 is connected to the vent port 29 of valve port 23. This bleeder is preferably of a type adjustable over a wide range and for making fine adjustments of the rate of bleed throughout the wide range. Such bleeders are well-known and commercially available. Valve 23 normally blocks the inlet 25 and connects the outlet 27 and the vent port 29. Hence it normally vents control 19 via line 31, ports 27 and 29 and bleeder 33. Valve 23 when activated supplies air from the inlet 25 to the outlet 27 (and thence via line 31 to the control 19), and blocks the vent port 29. Relay valve 23 has a control indicated at 35 operable by air under pressure for activating it, being inactivated upon venting of the control 35. As shown, the relay valve control 35 may be of the diaphragm type having a return spring for normally holding the valve 23 in its normal inactive position. A line 37 leads from the line 5 downstream from the reducing valve 7 to the inlet 25 of the relay valve 23. Line 37 includes an adjustable reducing valve 39 and a pressure gauge 41 downstream from the reducing valve.

Means for supplying air under pressure to and venting it from the relay valve control 35 is shown to comprise a manually operable valve 43 having an inlet 45 for air under pressure, an outlet 47, and a vent port 49. Valve 43 normally blocks the inlet 45 and connects the outlet 47 to the vent port 49. When manually activated, it supplies air from the inlet 45 to the outlet 47 and blocks the vent port 49. Valve 43 is shown as being of the push-button type having a return spring for normally holding it in its normal inactive position. A line 51 leads from line 37 downstream from reducing valve 39 to the inlet 45 of the manually operable valve 43. A line 53 connects the outlet 47 of the valve 43 to the relay valve control 35 and includes a check valve 55 adapted to open for flow of air to control 35 when valve 43 is activated. At 57 is indicated a by-pass around the check valve 55 including a bleeder 59, preferably of the adjustable type.

Operation is as follows:

The air pressure in vessel 1 is regulated in accordance with the elevation to which fumigant must be delivered from the vessel 1 by adjustment of the reducing valve 7. For example, with thirty p. s. i. in vessel 1, as may be determined from the gauge 9, the fumigant can be lifted to an elevation of approximately twenty feet. The pressure is in general increased one pound for every foot of elevation over twenty feet. Reducing valve 39 is adjusted to obtain pressure appropriate for controls 19 and 35 (and lower than that in the vessel) at the inlet 25 of valve 23 and at the inlet 45 of valve 43. For example, this pressure may be fifteen p. s. i.

To dispense a dose of fumigant from the vessel 1, the operator depresses the push button of valve 43 and quickly releases it. Upon such activation of the valve 43, a charge of air is delivered to the control 35 for the relay valve 23. Check valve 55 opens to deliver this charge of air, but closes as soon as the valve 43 is released and returns to its inactive position. The pressure so developed in control 35 bleeds off via by-pass 57 and bleeder 59, the bleeder being adjusted to hold operating pressure in control 35 long enough to insure operation of valve 23 and operation of valve 17 by valve 23. Bleeder 59 holds operating pressure in control 35 for only a relatively short interval.

The charge of air delivered as above described to the control 35 activates the relay valve 23, so that it delivers air from line 37 to line 31 and thence to the control 19 for the outlet valve 17. This opens the outlet valve 17 and fumigant is thereupon dispensed from the vessel 1 through lines 13 and 21 by the action of air under pressure in the vessel. Valve 23 is returned to its inactive position by the return spring of its control 35 as soon as pressure in control 35 drops below operating pressure due to air being bled out of control 35 via the bleeder 59. While this cuts off the supply of air from line 37 to the outlet valve control 19 and connects the control 19 to the vent port 29 of valve 23, pressure is held in control 19 for a predetermined period of time as determined by the adjustment of bleeder 33. This adjustment is so made as to hold operating pressure in control 19 thereby to maintain the valve 17 open for a period of time such as to dispense the desired dosage of fumigant. It will be understood that the dosage will be decreased by opening the bleeder 33 wider, and vice versa. When pressure in control 19 has bled off through line 31 and bleeder 33 to the point where valve 17 closes, all the valves are in their inactive position, and the apparatus is ready for dispensing another dose.

If the valve 43 is continuously held in active position, fumigant will be delivered from the vessel 1 in a continuous stream. This may be sometimes desired.

It will be understood that valves 7, 39 and 43 and bleeders 33 and 59 will usually be grouped by mounting on a control panel, along with gauges 9 and 41, for convenient operation.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. Apparatus for dispensing measured dosages of a liquid, comprising a pressure vessel for containing a supply of the liquid, means for introducing air under pressure into the vessel, an outlet line for liquid leading from the vessel, an outlet valve in said outlet line having a control operable by air under pressure for opening the valve and adapted upon being vented to close the valve, a relay valve having an inlet for air under pressure, an outlet connected to said outlet valve control, and a vent port, an adjustable bleeder connected to the vent port, said relay valve, when inactive, blocking the inlet and venting the outlet and hence venting the control for the outlet valve via the vent port and bleeder and, when active, supplying air from the inlet to the outlet and thence to the control for the outlet valve and blocking the vent port, said relay valve having a control operable by air under pressure for activating it and being inactivated upon venting of the control, and means for supplying air under pressure to and venting it from said relay valve control including a manually operable valve having an inlet for air under pressure, an outlet, and a vent port, said manually operable valve, when inactive, blocking its inlet and venting its outlet to its vent port, and when manually activated, supplying air from its inlet to its outlet and blocking its vent port, a line connecting the outlet of the manually operable valve to the relay valve control and including a check valve adapted to open for flow of air to the relay valve control when the manually operable valve is activated, and a bypass around the check valve including a bleeder.

2. Apparatus for dispensing measured dosages of a liquid, comprising a pressure vessel for containing a supply of the liquid, a first line including a first reducing valve for introducing air under pressure into the vessel, an outlet line for liquid leading from the vessel, an outlet valve in said outlet line having a control operable by air under pressure for opening the valve and adapted upon being vented to close the valve, a relay valve having an inlet for air under pressure, an outlet connected to said outlet valve control, and a vent port, an adjustable bleeder connected to the vent port, said relay valve, when inactive, blocking the inlet and venting the outlet and hence venting the control for the outlet valve via the vent port and bleeder and, when active, supplying air from the inlet to the outlet and thence to the control for the outlet valve and blocking the vent port, a second line leading from the first line downstream from the first reducing valve to the inlet of the relay valve, said second line including a second reducing valve, said relay valve having a control operable by air under pressure for activating it and being inactivated upon venting of the control, and means for supplying air under pressure to and venting it from said relay valve control comprising a manually operable valve having an inlet for air under pressure, an outlet, and a vent port, said manually operable valve, when inactive, blocking its inlet and venting its outlet to its vent port, and when manually activated, supplying air from its inlet to its outlet and blocking its vent port, a line leading from said second line downstream from said second reducing valve to the inlet of the manually operable valve, a line connecting the outlet of the manually operable valve to the relay valve control and including a check valve adapted to open for flow of air to the relay valve control when the manually operable valve is activated, and a by-pass around the check valve including a bleeder.

3. Apparatus for dispensing measured dosages of a liquid, comprising a pressure vessel for containing a supply of the liquid, a first line including a first reducing valve for introducing air under pressure into the vessel, said reducing valve being adjustable to regulate the air pressure in the vessel, an outlet line for liquid leading from the vessel, an outlet valve in said outlet line having a control operable by air under pressure for opening the valve and adapted upon being vented to close the valve, a relay valve having an inlet for air under pressure, an outlet connected to said outlet valve control, and a vent port, an adjustable bleeder connected to the vent port, said relay valve, when inactive, blocking the inlet and venting the outlet and hence venting the control for the outlet valve via the vent port and bleeder and, when active, supplying air from the inlet to the outlet and thence to the control for the outlet valve and blocking the vent port, a second line leading from the first line downstream from the first reducing valve to the inlet of the relay valve, said second line including a second reducing valve, said second reducing valve being adjustable to regulate the pressure in the second line downstream from the second reducing valve, said relay valve having a control operable by air under pressure for activating it and being inactivated upon venting of the control, and means for supplying air under pressure to and venting it from said relay valve control comprising a spring-returned push-button valve having an inlet for air under pressure, an outlet, and a vent port, said push-button valve, as held in inactive position by its return spring, blocking its inlet and venting its outlet to its vent port, and when pushed supplying air from its inlet to its outlet and blocking its vent port, a line leading from said second line downstream from said second reducing valve to the inlet of the push-button valve, a line connecting the outlet of the push-button valve to the relay valve control and including a check valve adapted to open for flow of air to the relay valve control when the push-button valve is pushed, and a by-pass around the check valve including an adjustable bleeder.

References Cited in the file of this patent
UNITED STATES PATENTS
1,029,687    Johnson _____ June 18, 1912